(12) United States Patent
Buzdum

(10) Patent No.: US 7,165,571 B1
(45) Date of Patent: Jan. 23, 2007

(54) DUAL PNEUMATIC QUICK-DISCONNECT COUPLER ADAPTER

(76) Inventor: Mirko Buzdum, N7721 Maple Ridge Rd., Oconomowoc, WI (US) 53066

( * ) Notice: Subject to any disclaimer, the term of this patent is extended or adjusted under 35 U.S.C. 154(b) by 28 days.

(21) Appl. No.: 11/148,120

(22) Filed: Jun. 8, 2005

(51) Int. Cl.
*F16L 21/00* (2006.01)

(52) U.S. Cl. .......................... 137/112; 137/798; 285/12

(58) Field of Classification Search ................ 137/111, 137/112, 113, 605, 606, 798, 881, 884; 285/12, 285/133.4, 914
See application file for complete search history.

(56) References Cited

U.S. PATENT DOCUMENTS

| | | | | |
|---|---|---|---|---|
| 2,237,014 A | * | 4/1941 | Stoehrer | 137/112 |
| 2,627,388 A | * | 2/1953 | Johnson et al. | 137/113 |
| 2,641,272 A | * | 6/1953 | Seale | 137/112 |
| 2,805,871 A | * | 9/1957 | Hammon | 285/18 |
| 3,410,294 A | * | 11/1968 | Heideman et al. | 137/113 |
| 3,760,842 A | * | 9/1973 | Mikiya | 137/557 |
| 4,709,945 A | * | 12/1987 | Stoll | 285/4 |
| 5,090,740 A | * | 2/1992 | Creager et al. | 285/61 |
| 5,257,826 A | * | 11/1993 | Prassas et al. | 285/148.19 |
| 5,261,704 A | * | 11/1993 | Araujo et al. | 285/9.1 |
| 6,742,995 B1 | * | 6/2004 | Wood et al. | 417/234 |
| 6,834,666 B1 | * | 12/2004 | Murayama et al. | 137/269 |
| 6,902,209 B1 | * | 6/2005 | McInerney | 285/384 |

* cited by examiner

*Primary Examiner*—John Fox
(74) *Attorney, Agent, or Firm*—Donald J. Ersler

(57) ABSTRACT

A dual pneumatic quick-disconnect coupler preferably includes a valve body, a sealing ball and two pipe tap sleeves. The valve body includes a ball cavity that retains the sealing ball. A pipe tap nipple extends from one side of the ball cavity and two threaded holes are formed through the other side thereof. A quick-disconnect plug is threaded into one end of the pipe tap sleeve and a ball seat is formed in the other end to receive the sealing ball. An air hose with a quick-disconnect coupler is attached to one of the quick-disconnect plugs. Air traveling through the air hose will force the sealing ball to seal the unused quick-disconnect plug. A second embodiment seals each quick-disconnect coupler with a spring loaded piston. A third embodiment seals each quick-disconnect coupler with a flapper valve.

15 Claims, 4 Drawing Sheets

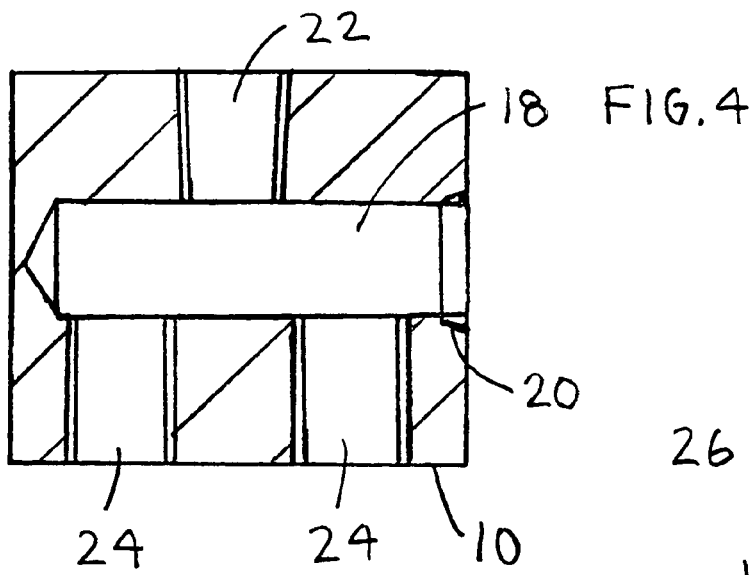
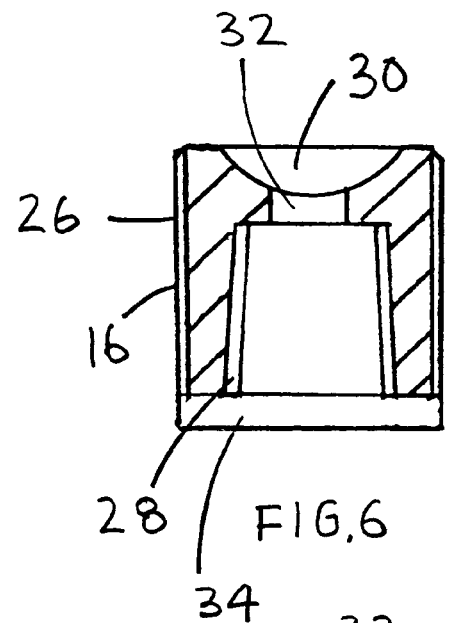
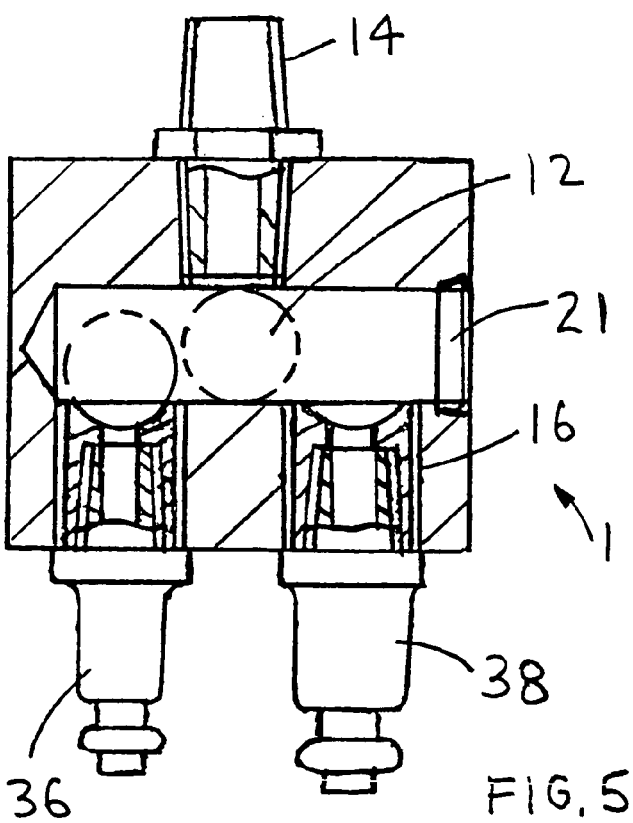
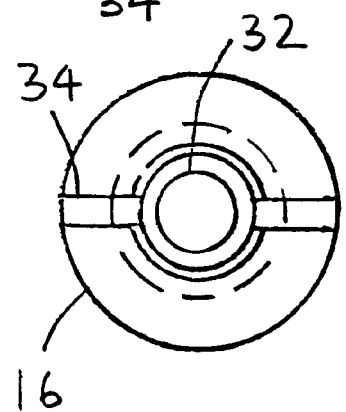

DUAL PNEUMATIC QUICK-DISCONNECT COUPLER ADAPTER

BACKGROUND OF THE INVENTION

1. Field of the Invention

The present invention relates generally to quick disconnect plugs and more specifically to a dual pneumatic quick-disconnect coupler, which provides a choice of at least two different sizes and/or styles of quick-disconnect plugs.

2. Discussion of the Prior Art

There are numerous sizes and styles of quick-disconnect couplers. If one size or style of a quick-disconnect plug is threaded into a pneumatic driven device, such as a pneumatic power tool and another size or style of a quick-disconnect coupler is retained on an air hose; the user must remove the existing quick disconnect plug and install an appropriate quick-disconnect plug on the pneumatic driven device. It appears that the prior art does not disclose a device that offers at least two sizes or styles of quick-disconnect plug.

Accordingly, there is a clearly felt need in the art for a dual pneumatic quick-disconnect coupler, which provides a choice of at least two different sizes and/or styles of quick-disconnect plugs.

SUMMARY OF THE INVENTION

The present invention provides a dual pneumatic quick-disconnect coupler, which includes the choice of at least two different sizes and/or styles of quick-disconnect plugs. The dual pneumatic quick-disconnect coupler (dual coupler) preferably includes a valve body and a sealing ball. The valve body includes a ball cavity that is sized to receive the sealing ball. A pipe tap is formed through one side of the ball cavity and two threaded holes are formed through the other side of the ball cavity. The two threaded holes preferably receive two pipe tap sleeves. Each pipe tap sleeve includes a thread formed on an outer perimeter and a pipe tap formed therein at one end. A ball seat is formed in the other end of the pipe tap sleeve to receive the sealing ball.

One end of a hollow pipe tap nipple is threaded into the pipe tap. Two quick-disconnect plugs are threaded into the two pipe tap sleeves. The other end of the hollow pipe tap nipple is threaded into the pneumatic driven device. An air hose with a quick-disconnect coupler is attached to one of the two quick-disconnect plugs. Air traveling through the air hose will force the sealing ball to seal the unused quick-disconnect plug and the pressurized air will flow through the hollow pipe tap nipple into the pneumatic driven device pneumatic driven device.

A second embodiment of a dual coupler preferably includes a valve body, at least two sealing pistons and at two least compression springs. The at least two sealing pistons normally seal the at least two quick-disconnect plugs, until an air hose is secured to one of the at least two quick-disconnect plugs. A third embodiment of a dual coupler preferably includes a valve body and at least two threaded valve sleeves. Each threaded valve sleeve includes a flapper valve disposed on one end and a pipe tap formed in the other end thereof. The pipe tap is sized to threadable receive a quick-disconnect plug. When a pressurized air hose is applied to one of the quick-disconnect plugs, the flapper value of the threaded valve sleeve opens, but the other flapper valves remain closed.

Accordingly, it is an object of the present invention to provide a dual coupler, which provides a choice of at least two different sizes and/or styles of quick-disconnect plugs.

These and additional objects, advantages, features and benefits of the present invention will become apparent from the following specification.

BRIEF DESCRIPTION OF THE DRAWINGS

FIG. 4 is a side cross sectional view of a valve body of a dual coupler in accordance with the present invention.

FIG. 5 is a side cross sectional view of a dual coupler in accordance with the present invention.

FIG. 6 is a side cross sectional view of a pipe tap sleeve of a dual coupler in accordance with the present invention.

FIG. 7 is a bottom view of a pipe tap sleeve of a dual coupler in accordance with the present invention.

DETAILED DESCRIPTION OF THE PREFERRED EMBODIMENTS

Figure 1:
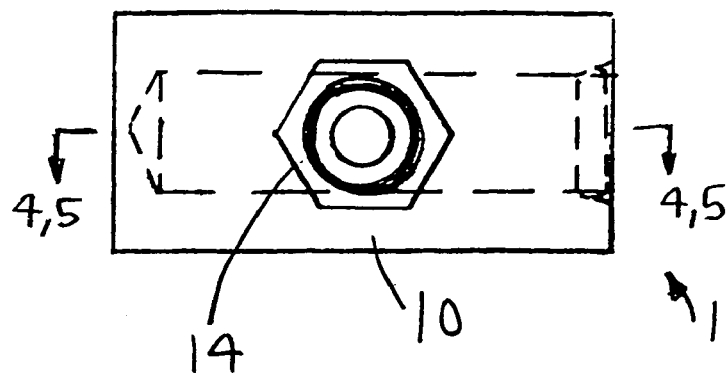
FIG. 1 is a top view of a dual coupler in accordance with the present invention.
Figure 2:
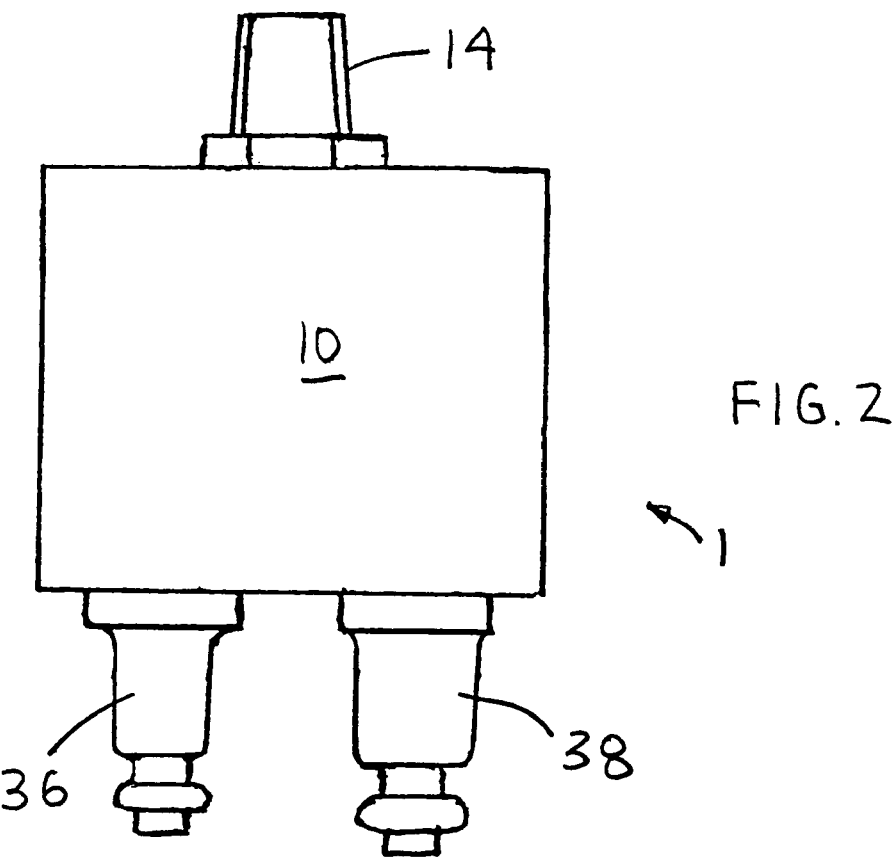
FIG. 2 is a front view of a dual coupler in accordance with the present invention.
Figure 3:
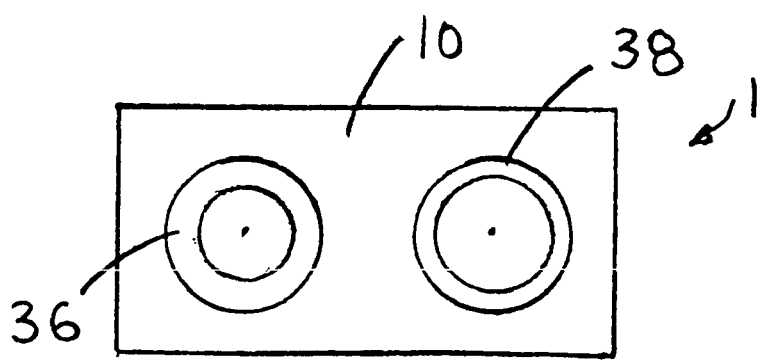
FIG. 3 is a bottom view of a dual coupler in accordance with the present invention.

With reference now to the drawings, and particularly to FIG. 2, there is shown a front view of a dual coupler 1. With reference to FIGS. 1 and 3–7, the dual coupler 1 preferably includes a valve body 10, a sealing ball 12, a hollow pipe tap nipple 14 and two pipe tap sleeves 16. A ball hole 18 is preferably drilled substantially through a side of the valve body 10. The ball hole 18 is sized to receive the sealing ball 12. A pipe tap 22 is preferably formed through one side of the ball hole 18 and two threaded holes 24 are formed through an opposing side of the ball hole 18. The two threaded holes 24 are sized to threadably receive the two pipe tap sleeves 16. A shallow pipe tap 20 is preferably formed in an entrance of the ball hole 18 to threadably receive a sealing plug 21. However, other methods of plugging the ball hole 18 may also be used. Once the ball hole 18 is sealed, it may be referred to as a ball cavity.

Each pipe tap sleeve 16 preferably includes an outer thread 26 formed on an outer diameter and a pipe tap 28 formed in one end of the pipe tap sleeve 16. It is preferable to use the pipe tap 28, but other suitable threaded taps may also be used. A ball seat 30 is formed in the other end of the pipe tap sleeve 16 to receive the sealing ball 12. An air passage 32 is formed through the pipe tap 28 and the ball seat 30 to allow the flow of pressurized air. A rotation slot 34 is preferably formed in the one end of the pipe tap sleeve 16 to receive a flat screw driver blade or the like. However, other methods of turning the pipe tap sleeve 16 in the threaded hole 24 may also be used, such as a hex cavity. Pipe tap sleeves with different threaded taps may also be used to receive different sizes or styles of quick disconnect plugs.

Figure 5A:
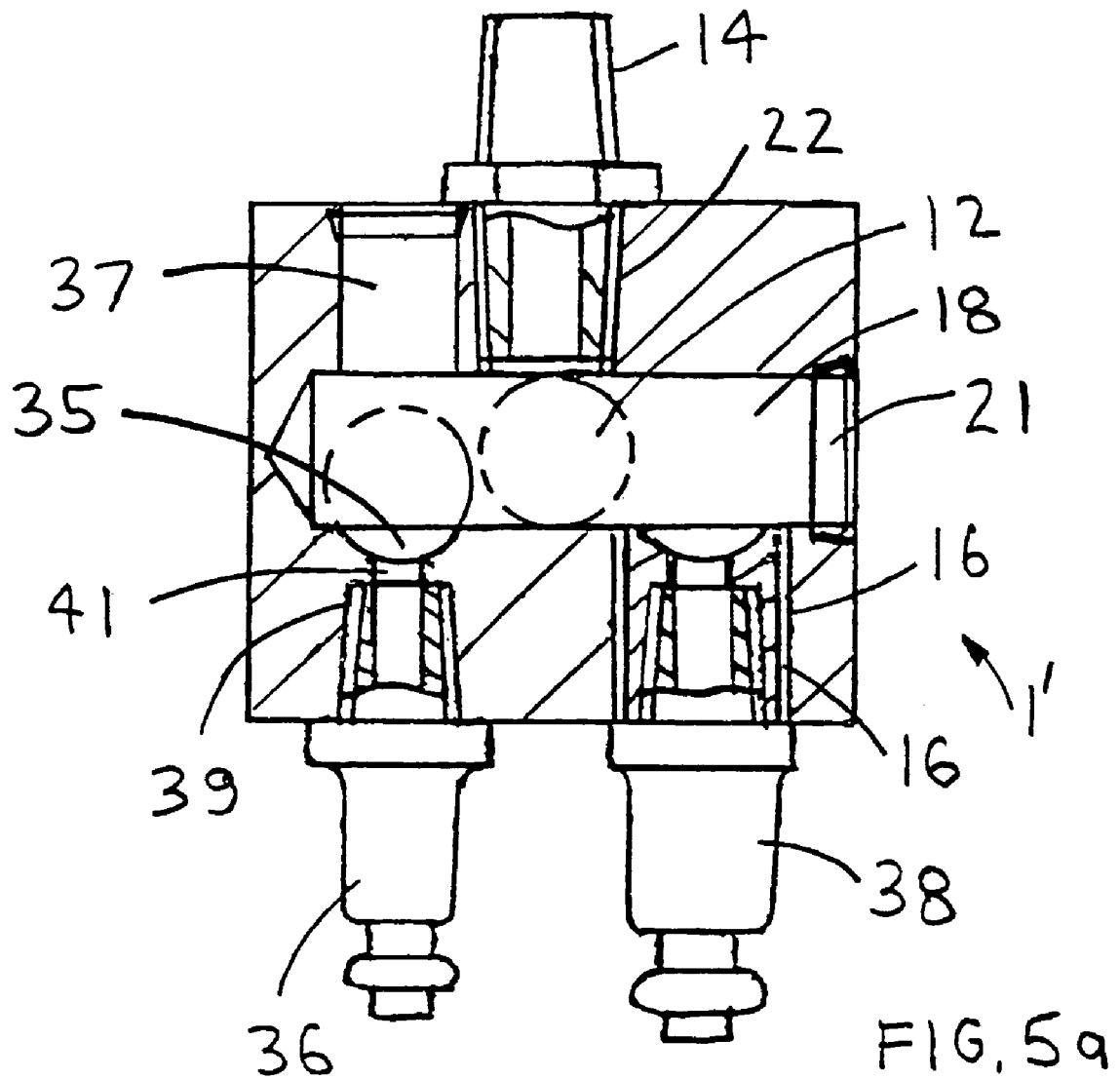
FIG. 5a is a side cross sectional view of a dual coupler having a single pipe tap sleeve in accordance with the present invention.

With reference to FIG. 5a, each pipe tap sleeve 16 may be eliminated by forming a body ball seat 35 in the outer perimeter of the ball hole 18. The body ball seat 35 may be formed by drilling through the valve body 10 into the outer perimeter of the ball hole 18 and forming the body ball seat 35 with an appropriate cutting tool. The drilled hole 37 may be plugged with any suitable sealing method. A body threaded tap 39 would be located adjacent the body ball seat 35 to receive a quick-disconnect plug. An air passage hole 41 would be formed through the threaded tap 37 and the body ball seat 35.

The hollow pipe tap nipple 14 includes opposing threaded ends. One end of the hollow pipe tap nipple 14 is threaded into the pipe tap 22 and the other end is threaded into an air port of a pneumatic driven device (not shown). A first quick-disconnect plug 36 is threaded into one of the two pipe tap sleeves 16 and a second quick-disconnect plug 38 is threaded into the other one of the two pipe tap sleeves 16. A quick-disconnect coupler of an air hose is secured to one of the two quick-disconnect plugs 36, 38. Air traveling through the air hose will force the sealing ball 12 to seal the unused quick-disconnect plug. Pressurized air will flow through the quick disconnect plug, the hollow pipe tap nipple 14 into the air port of the pneumatic driven device.

Figure 8:
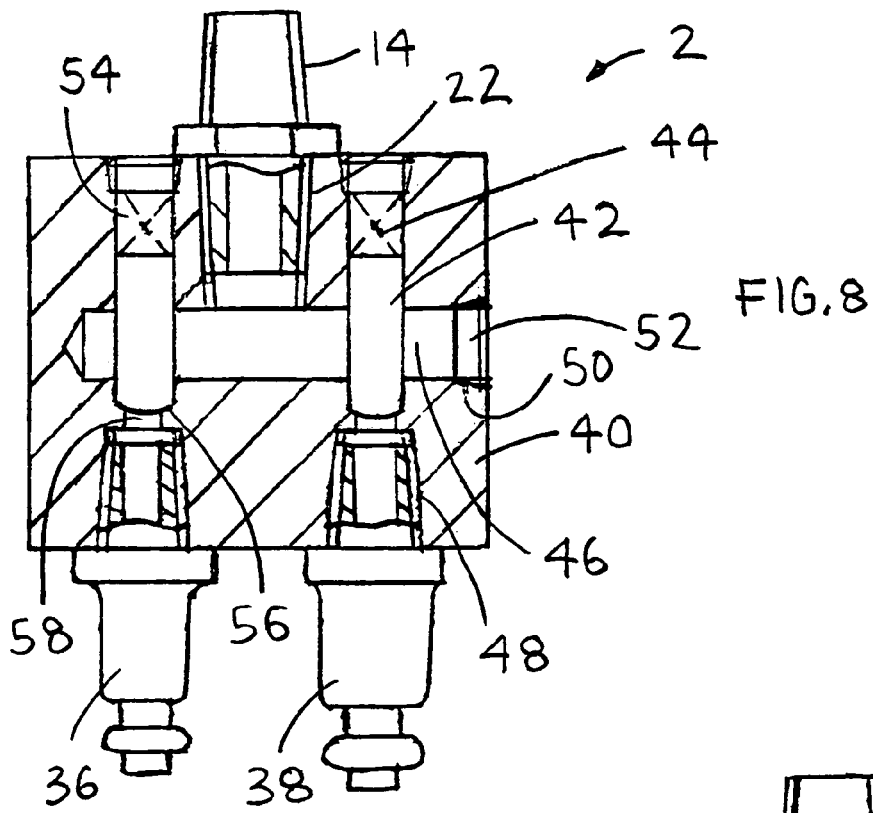
FIG. 8 is a side cross sectional view of a second embodiment of a dual coupler in accordance with the present invention.

With reference to FIG. 8, a second embodiment of a dual coupler 2 preferably includes a valve body 40, the hollow pipe tap nipple 14, at least two sealing pistons 42 and at two least compression springs 44. An air flow passage 46 is preferably drilled substantially through a side of the valve body 40. The air flow passage 46 may be referred to as a cavity. At least two pipe taps 48 are formed in a bottom of the valve body 40. The at least two pipe taps 48 are sized to threadably receive the at least two quick-disconnect plugs 36, 38. A shallow pipe tap 50 is preferably formed in an entrance of the air flow passage 46 to threadably receive a sealing plug 52. However, other methods of plugging the air flow passage 46 may also be used.

At least two sealing cylinders 54 are formed in the valve body 40. A bottom of each sealing cylinder 54 preferably has a curved bottom seat 56. The curved bottom seat 56 is sized to received a curved end of the sealing piston 42. An air passage 58 is formed through each threaded tap to the sealing cylinder 54 to provide for the flow of pressurized air. A pipe tap sleeve with a curved bottom seat 56 may substituted for any or all of the pipe taps 48. An air hose with a quick-disconnect coupler is secured to one of the at least two quick-disconnect plugs 36, 38. Air traveling through the air hose will force one of the at least two sealing pistons upward, which allows air to flow through one of the at least two quick disconnect plugs 36, 38, the hollow pipe tap nipple 14 and into the air port of the pneumatic driven device.

Figure 9:
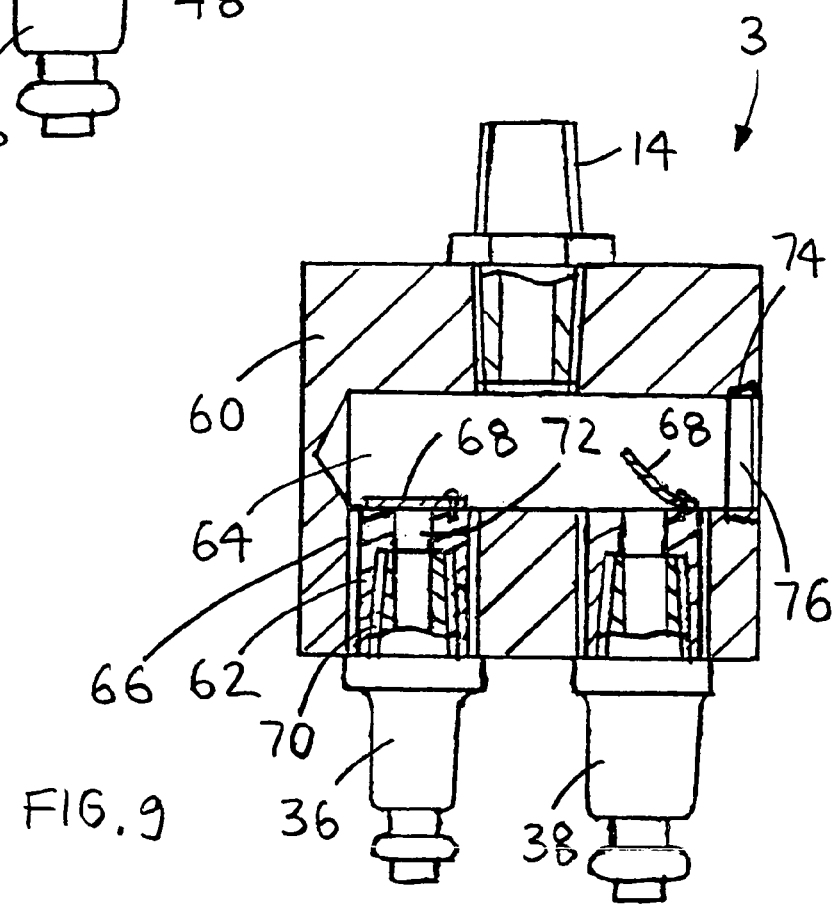
FIG. 9 is a side cross sectional view of a third embodiment of a dual coupler in accordance with the present invention.

With reference to FIG. 9, a third embodiment of a dual coupler 3 preferably includes a valve body 60, the hollow pipe tap nipple 14 and at least two valve tap sleeves 62. An air flow passage 64 is preferably drilled substantially through a side of the valve body 40. The air flow passage 64 may be referred to as a cavity. At least two threaded holes 66 are formed in a bottom of the valve body 40. The at least two threaded holes 66 are sized to threadably receive the at least two threaded valve sleeves 62. Each threaded valve sleeve 62 includes a flapper valve 68 secured to one end and a threaded tap 70 formed in the other end thereof. The threaded tap 70 is sized to threadable receive the quick-disconnect plugs 36, 38. An air passage 72 is formed through each valve tap sleeve 62. The flapper valve 68 prevents air from exiting the other end of the valve tap sleeve 62.

A shallow pipe tap 74 is preferably formed in an entrance of the air flow passage 64 to threadably receive a sealing plug 76. However, other methods of plugging the air flow passage 64 may also be used. An air hose with a quick-disconnect coupler is secured to one of the at least two quick-disconnect plugs 36, 38. Air traveling through the air hose will open one of the at least two flapper valves 68, which allows air to flow through one of the at least two quick disconnect plugs 36, 38, the hollow pipe tap nipple 14 and into the air port of the pneumatic driven device.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of providing a choice of two different quick-disconnect plug sizes or styles for powering a pneumatic driven device, comprising the steps of:
    providing a valve body with a cavity;
    connecting an air port of the pneumatic driven device to said cavity;
    securing two different quick disconnect plugs to said valve body, said two different quick disconnect plugs communicating with said cavity; and
    sealing one of said two different quick disconnect plugs and opening the other one thereof to allow the flow of air therethrough to the pneumatic driven device.

2. The method of providing a choice of two different quick-disconnect plug sizes or styles for powering a pneumatic driven device of claim 1, further comprising the step of:
    retaining a ball in said cavity for sealing one of said two different quick disconnect plugs.

3. The method of providing a choice of two different quick-disconnect plug sizes or styles for powering a pneumatic driven device of claim 1, further comprising the step of:
    threading at least one pipe tap sleeve into said valve body, threading one of said two different quick-disconnect plugs into said at least one pipe tap sleeve.

4. The method of providing a choice of two different quick-disconnect plug sizes or styles for powering a pneumatic driven device of claim 3, comprising the steps of:
    each one of said at least one pipe tap sleeve including a pipe tap formed in one end and a sleeve ball seat formed in the other end thereof, an air passage being formed through said sleeve ball seat and said pipe tap.

5. The method of providing a choice of two different quick-disconnect plug sizes or styles for powering a pneumatic power device of claim 1, comprising the steps of:
    extending a threaded nipple from said valve body, said threaded nipple being threadably received by an air port of the pneumatic driven device, air flowing through said threaded nipple from said ball cavity to the pneumatic driven device.

6. The method of providing a choice of two different quick-disconnect plug sizes or styles for driving a pneumatic driven device of claim 1, further comprising the step of:
    sealing each one of said two different quick disconnect plugs with a spring loaded piston.

7. The method of providing a choice of two different quick-disconnect plug sizes or styles for driving a pneumatic driven device of claim 1, further comprising the step of:
    sealing each one of said two different quick disconnect plugs with a valve tap sleeve, a flapper valve covering one end of said valve tap sleeve and one of said two different quick disconnect plugs being threaded into the other end thereof.

8. A method of providing a choice of two different quick-disconnect plug sizes or styles for driving a pneumatic driven device, comprising the steps of:
provideing a valve body having a ball cavity;
connecting an air port of the pneumatic driven device to said ball cavity;
providing a sealing ball that is sized to be received by said ball cavity;
forming two ball seats adjacent a perimeter of said ball cavity; and
securing two quick disconnect plugs adjacent said at two ball seats, said two quick disconnect plugs communicating with said cavity.

9. The method of providing a choice of at least two different quick-disconnect plug sizes or styles for driving a pneumatic driven device of claim 8, comprising the steps of:
threading at least one pipe tap sleeve into said valve body, threading at least one quick-disconnect plug into said at least one pipe tap sleeve.

10. The method of providing a choice of at least two different quick-disconnect plug sizes or styles for driving a pneumatic driven device of claim 9, comprising the steps of:
each one of said at least one pipe tap sleeve including a pipe tap formed in one end and a sleeve ball seat formed in the other end thereof, an air passage being formed through said sleeve ball seat and said pipe tap.

11. The method of providing a choice of at least two different quick-disconnect plug sizes or styles for driving a pneumatic driven device of claim 8, comprising the steps of:
extending a threaded nipple from said valve body, said threaded nipple being threadably received by an air port of the pneumatic driven device, air flowing through said threaded nipple from said ball cavity to the pneumatic driven device.

12. The method of providing a choice of at least two different quick-disconnect plug sizes or styles for driving a pneumatic driven device of claim 11, comprising the steps of:
providing said threaded nipple with one end threaded into said valve body and the other end threaded into the pneumatic driven device.

13. The method of providing a choice of at least two different quick-disconnect plug sizes or styles for driving a pneumatic driven device of claim 8, comprising the steps of:
drilling a ball hole substantially through said valve body, sealing an open end of said ball hole to form said ball cavity.

14. The method of providing a choice of at least two different quick-disconnect plug sizes or styles for driving a pneumatic driven device of claim 8, comprising the steps of:
threading two quick-disconnect plugs into said valve body, attaching a quick-disconnect coupler of an air hose to one of said two quick disconnect plugs, said sealing ball falling into one of said two ball seats to seal the unused of the two quick disconnect plugs.

15. A method of providing a choice of two different quick-disconnect plug sizes or styles for powering a pneumatic driven device, comprising the steps of:
providing a valve body with a cavity;
connecting an air port of the pneumatic driven device to said cavity;
securing two different quick disconnect plugs to said valve body, said two different quick disconnect plugs communicating with said cavity; and
sealing one of said two different quick disconnect plugs with a ball, retaining said ball in said cavity, opening the other one of said two different quick disconnect plugs to allow air flow therethrough to the pneumatic driven device.

\* \* \* \* \*